United States Patent Office 2,750,299
Patented June 12, 1956

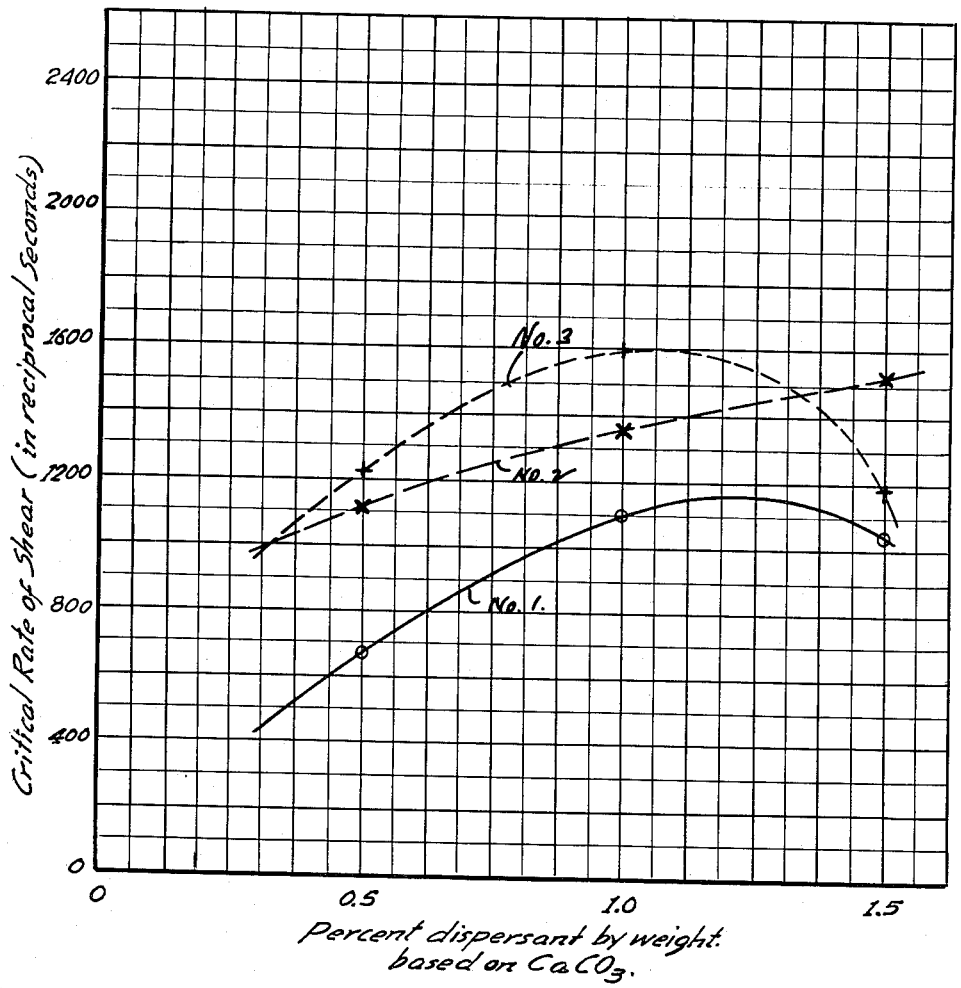

2,750,299

CALCIUM CARBONATE DISPERSIONS AND METHOD OF MAKING SAME

Gerald D. Hansen, Jr., Richland Township, Allegheny County, Pa., assignor to Calgon, Incorporated, Pittsburgh, Pa., a corporation of Pennsylvania Application March 30, 1953, Serial No. 345,318

10 Claims. (Cl. 106—308)

This invention relates to the dispersion of calcium carbonate and to improved products for achieving complete and rapid dispersion of this compound in water or in aqueous solutions.

Precipitated calcium carbonate is used extensively as a filler for paper or in paper coating mixes as well as for other purposes. It has been found quite difficult to disperse this material in water and it is an object of the present invention to provide for dispersing or deflocculating precipitated calcium carbonate slurries with a minimum of time, effort, and expense. By the present invention, a much more concentrated slurry can be produced without increasing the slurry viscosity. Likewise, the viscosity of a slurry of given concentration may subsequently be reduced if desired. It is of course a material advantage to be able to produce a more concentrated slurry provided the viscosity is such that the slurry can be flowed and otherwise handled with convenience. The use of a more concentrated slurry means that a smaller volume of slurry will have to be handled and less water will have to be evaporated from the paper during subsequent coating and drying operations. These benefits may be obtained when my invention is applied to either finely divided calcium carbonate which is produced by grinding the mineral calcite or to calcium carbonate which is produced by chemical precipitation.

In view of their ability to deflocculate clays and other finely divided solids, the alkali metal polyphosphates such as sodium metaphosphate, sodium tetraphosphate, and other molecularly dehydrated alkali-metal phosphates have been tried as dispersants for calcium carbonate but with poor results unless the slurry is subjected to extensive mechanical kneading or beating for a prolonged time. It is surprising that this is the case since in the deflocculation of various clays, particularly where those clays are used in the preparation of slips for use in paper coating mixes, the alkali-metal polyphosphates are strikingly effective. Oddly enough this effectiveness does not carry over into the dispersion of precipitated calcium carbonate to a degree which would be expected by one skilled in the art.

To improve the deflocculating properties of the alkali metal polyphosphates in connection with the dispersion of clays and certain other finely divided solids in drilling muds, Williams in U. S. Patent 2,315,995 teaches the use of "a water soluble glass which is a shock chilled anhydrous glassy melt of an alkali metal phosphate homogeneously associated with an oxygen containing compound, of a normally solid element other than phosphorus, of groups 2–8 of the periodic system having a normally solid oxide, the content of said element, in terms of its oxide, in said glass being at least 1% by weight."

I have found that a product made according to the teaching of U. S. Patent 2,315,995 containing 100 parts by weight of Calgron brand sodium metaphosphate (having a molar ratio of $Na_2O$ to $P_2O_5$ of 1.1 to 1) and 14.5 parts by weight of zinc oxide gives good dispersions of calcium carbonate, without kneading the slurry under certain limited conditions of low shearing rates and low alkalinity in the slurry. Unfortunately, in most paper mills these conditions are not encountered.

The movement of high solids dispersions of calcium carbonate is usually accomplished in a paper mill by pumping the dispersion from one vessel to another by means of centrifugal pumps. These centrifugal pumps commonly develop rates of shear in the range of 500 to 600 reciprocal seconds. High solids calcium carbonate dispersions have a tendency to become dilatant in this range of shearing rates and hence may easily cause the pump to become overloaded with resulting damage to the pump motor. Also, slurries which exhibit pronounced dilatancy may easily overload the mixer during the preparation of the slurry. It is obviously desirable to maintain the dilatancy of a pigment slurry at a minimum thereby preventing damage to the equipment at the same time reducing power requirements for mixing.

In the manufacture of commercial precipitated calcium carbonate, particularly in paper mills where it is used for coating paper, there is almost always some residual alkali as NaOH remaining in the finished product. This residual alkali will vary but the concentration generally ranges from 0.25 per cent to about 0.4 per cent or sometimes as high as 0.45 per cent based on the weight of the calcium carbonate. Although this residue can be almost completely removed by repeated washings with water, the time and money spent to free the calcium carbonate completely from residual alkali is not at all practical. Surprisingly enough, it appears that the presence of this residual alkali has a direct bearing upon the dispersibility of the commercial calcium carbonate. The greater the concentration of alkali the more difficult the dispersion becomes.

Now I have made the surprising discovery that by incorporating small amounts of certain potassium or lithium salts or hydroxides with a phosphate glass containing a major proportion of sodium metaphosphate and a minor proportion of zinc oxide, I am able to obtain excellent results in the deflocculation of commercial precipitated calcium carbonate without the need for mechanical kneading and the like, even where the objectionable residual alkali is present.

I am unable to explain the mechanism whereby the potassium and lithium compounds react as they do to improve the dispersing power of the sodium phosphate glass-metal oxide combination. It is possible that the presence of a small amount of the additive compound causes a shift in the equilibrium constant of the sodium phosphate system. I have found that the most effective additives are the mono-valent alkali metal phosphates lithium metaphosphate and potassium metaphosphate. These salts exist both as glasses and crystalline materials, in each instance having the formula $LiPO_3$ and $KPO_3$ respectively. The lithium or potassium salts (or hydroxides) may be fused into the sodium metaphosphate-zinc oxide glass or they may be mechanically admixed with it. I prefer to use the lithium or potassium metaphosphate or carbonate since they control the pH and their use avoids the introduction of anions other than $CO_3$ or $PO_3$ as would be the case if a chloride, sulfate, etc. were used. This improvement is obtained with the surprisingly small amount of from about 0.05 mol to about 0.10 mol per 100 grams of sodium metaphosphate in the glass. This is equivalent to from about 0.5% to about 8.0% by weight of potassium or lithium salt or hydroxide based on the weight of sodium metaphosphate in the glass.

By intimately mixing the sodium metaphosphate, the metal oxide, and the potassium or lithium metaphosphate, heating the mixture until fusion occurs at about 1000° C. followed by subsequent cooling, I produce a solid mass which can be ground to a fine powder or to any desired particle size which will result in rapid solubility for use in any particular application. No extraneous anion such as the nitrate, chloride, etc. of the metal which might exert a deleterious effect on dispersibility is introduced by this process. The final product is non-hygroscopic and can be stored without taking any particular precaution to exclude moisture from the material.

My product is essentially a three-phase, homogeneous fused product comprising (a) sodium metaphosphate, (b) a metal oxide, and (c) potassium or lithium metaphosphate. While I may use any sodium phosphate glass having a molar ratio of $Na_2O$ to $P_2O_5$ of from about 0.9:1 to about 1.5:1 (the tetraphosphate composition) I prefer to use the material known as commercially modified sodium hexametaphosphate which has a molar ratio of sodium oxide to phosphorus pentoxide of 1.1:1. As for the metal oxide, I have found that zinc oxide is by far the most satisfactory oxide and in fact the only really satisfactory metal oxide for this application. As for the potassium or lithium metaphosphate, I prefer to use the crystalline potassium or lithium metaphosphate whas has a molar ratio of $M_2O$ to $P_2O_5$ of 1:1 where M is lithium or potassium. Any suitable potassium or lithium salt, as for example the chloride, sulfate, nitrate, carbonate (or hydroxide) and others can be used as alternate sources of the $K^+$ ion or $Li^+$ ion but here again the extraneous anion would be introduced except in the case of the carbonate.

The proportions of ingredients in my three-phase product is somewhat critical. I prefer to use a product which contains about 83.5% by weight of sodium metaphosphate (having a molar ratio of $Na_2O:P_2O_5$ of 1.1:1), about 11.5% zince oxide, and about 5.0% potassium metaphosphate, although satisfactory products can be made within the ranges of from about 81% to about 88% phosphate, from about 10% to about 15% metal oxide, and from about 0.5% to about 8.0% potassium metaphosphate or lithium metaphosphate. All percentages are on a weight basis.

In Figure 1 is shown a comparison of the effectiveness of potassium and lithium salts in reducing the dilatancy of calcium carbonate dispersions dispersed with various glasses described below. Along the X-axis of Figure 1 is plotted the amount of dispersant used. Along the Y-axis is plotted the critical rate of shear in reciprocal seconds at which the dispersion became dilatant. The critical rate of shear at which the dispersion became dilatant was determined by testing the dispersions in a rotating type viscometer which is capable of producing rates of shear up to 8400 sec.$^{-1}$, and which automatically records the rate of shear versus the corresponding torque developed by the viscous drag of the test material. The rate of shear at which the consistency curve (rate of shear vs. torque) broke and became parallel to the torque axis was taken as the critical rate of shear. This point is the point at which the amount of work performed on the dispersion to further increase the rate of shear approaches infinity.

The dispersions were prepared by mixing the dispersant, precipitated calcium carbonate, and water together to form an aqueous dispersion containing 65% calcium carbonate solids. Curve No. 1 represents dispersions prepared with a dispersant consisting of a water soluble shock chilled glass containing 100 parts of Calgon brand sodium metaphosphate and 14.5 parts of zinc oxide. Curve No. 2 represents dispersions prepared with a dispersant consisting of a water soluble shock chilled glass containing 100 parts of Calgon brand sodium metaphosphate, 14.5 parts of zinc oxide, and 6.0 parts of potassium metaphosphate ($KPO_3$) equivalent to 0.051 mols potassium per 100 grams of Calgon. Curve No. 3 represents dispersions prepared with a dispersant consisting of a water soluble shock chilled glass containing 100 parts of Calgon brand sodium metaphosphate, 14.5 parts of zinc oxide, and 0.67 part of lithium carbonate, equivalent to 0.019 mols lithium per 100 grams of Calgon.

Curve No. 1 shows that with 0.5% dispersant the critical rate of shear was 660 sec.$^{-1}$ which was just about in the range of 500–600 sec.$^{-1}$ rate of shear produced by many centrifugal type pumps. In order to obtain a 100% margin of safety, which is extremely desirable from an engineering point of view, it was necessary to increase the dispersant to about 1.1% which gave a critical rate of shear of about 1150 sec.$^{-1}$. However, curves No. 2 and No. 3 show that this same critical rate of shear of about 1150 sec.$^{-1}$ could be obtained by incorporating either 5.0% potassium metaphosphate or 0.6% lithium carbonate into the glass and using only 0.5% dispersant. Thus the critical rate of shear could be doubled with less than half as much dispersant by incorporating the lithium or potassium salt into the glass. Now all three glasses would cost about the same to produce and hence their selling price would be about the same. It is therefore obvious that the cost of increasing the critical rate of shear (reducing the dilatancy of the dispersion) can be accomplished at less than one half the price of using the material employed in making the dispersions of curve No. 1. This is a very important consideration in any industrial operation.

An additional benefit that I derive from using dispersants containing potassium or lithium salts is increased stability of the dispersion to alkali. This is illustrated in the table which shows the maximum amount of residual alkali which the dispersions will tolerate without an undue increase in viscosity. (Each dispersant is identical in every respect to the dispersant used to obtain the data illustrated by the respective curves in Fig 1.) The dispersions contained 0.5% dispersant and 65% calcium carbonate solids.

Table

| Dispersant | Maximum residual alkali tolerance (as NaOH) |
|---|---|
| | Percent |
| No. 1 | 0.38 |
| No. 2 | 0.49 |
| No. 3 | 0.42 |

Although the above alkali tolerances may not appear significantly different, it must be recalled that residual alkali often exceeds 0.4 percent by weight of calcium carbonate, and for the first time, to my knowledge, it is now possible to disperse a calcium carbonate having a caustic residual of over 0.4 percent without resorting to physical means in addition to the use of a chemical additive. The use of the dispersant identified as "No. 2" actually permits the use of a calcium carbonate containing virtually 0.5 percent of NaOH without any further treatment.

I claim:

1. An aqueous slurry comprising calcium carbonate, water, and as a deflocculating agent, a fused, homogeneous mixture consisting of: (a) from about 81 percent to about 88 percent sodium phosphate glass having a molar ratio of $Na_2O:P_2O_5$ of from about 0.9:1 to about 1.5:1, (b) from about 10 percent to about 15 percent zinc oxide, (c) water soluble salt of an alkali metal selected from the group consisting of potassium and lithium, the concentration of the deflocculating agent being from about 0.5 percent to about 2.0 percent based on the dry weight of calcium carbonate in the slurry.

2. An aqueous slurry as described in claim 1 wherein component (c) is mechanically admixed with the sodium metaphosphate-zinc oxide glass.

3. An aqueous slurry comprising calcium carbonate, water, and as a deflocculating agent a fused, homogeneous mixture consisting of (a) sodium phosphate glass having a molar ratio of $Na_2O:P_2O_5$ of about 1.1:1, (b) zinc oxide, (c) potassium metaphosphate, the weight ratio of the component parts of the deflocculating agent being (a) about 83.5 percent, (b) about 11.5 percent, (c) about 5.0 percent, and the concentration of the deflocculating agent being from about 0.5 percent to about 2.0 percent based on the dry weight of calcium carbonate in the slurry.

4. A method of making an aqueous slurry consisting principally of calcium carbonate which comprises mixing the calcium carbonate and water with from about 0.5 percent to about 2.0 percent by weight of a deflocculating agent consisting of a fused, homogeneous mixture of (a) from about 81 percent to about 88 percent by weight of sodium phosphate glass having a molar ratio of sodium oxide to phosphorus pentoxide of from about 0.9 to 1 to about 1.5 to 1, (b) from about 10 percent to about 15 percent by weight of zinc oxide, and (c) from about 0.5 percent to about 8.0 percent by weight of a compound selected from the group consisting of the salt and hydroxide of an alkali-metal selected from the group consisting of potassium and lithium.

5. A method as described in claim 4 wherein component (c) is mechanically admixed with the sodium metaphosphate-zinc oxide glass.

6. A method of making an aqueous slurry consisting principally of calcium carbonate which comprises mixing the calcium carbonate and water with from about 0.5 percent to about 2.0 percent by weight of a deflocculating agent consisting of a fused, homogeneous mixture of (a) sodium phosphate glass having a molar ratio of $Na_2O:P_2O_5$ of about 1.1:1, (b) zinc oxide, (c) potassium metaphosphate, the weight ratio of the constituents of the deflocculating agent being (a) about 83.5 percent, (b) about 11.5 percent, (c) about 5.0 percent.

7. A new dispersant for use in dispersing finely divided calcium carbonate which consists of (a) from about 81 percent to about 88 percent sodium phosphate glass having a molar ratio of $Na_2O$ to $P_2O_5$ of from about 0.9:1 to about 1.5:1, (b) from about 10 percent to about 15 percent zinc oxide, (c) from about 0.5 percent to about 8.0 percent of a water soluble salt of an alkali metal selected from the group consisting of potassium and lithium.

8. A new dispersant for use in dispersing finely divided calcium carbonate which consists of (a) about 83.5 percent glassy sodium phosphate having a molar ratio of $Na_2O$ to $P_2O_5$ of about 0.9:1 to about 1.5:1, (b) about 11.5 percent zinc oxide, (c) about 5.0 percent potassium metaphosphate.

9. An aqueous slurry comprising calcium carbonate, water, and as a deflocculating agent, a fused, homogeneous mixture consisting of: (a) from about 81 percent to about 88 percent sodium phosphate glass having a molar ratio of $Na_2O:P_2O_5$ of from about 0.9:1 to about 1.5:1, (b) from about 10 percent to about 15 percent zinc oxide, (c) water soluble hydroxide of an alkali metal selected from the group consisting of potassium and lithium, the concentration of the deflocculating agent being from about 0.5 percent to about 2.0 percent based on the dry weight of calcium carbonate in the slurry.

10. An aqueous slurry as described in claim 9 wherein component (c) is mechanically admixed with the sodium metaphosphate-zinc oxide glass.

References Cited in the file of this patent
UNITED STATES PATENTS
2,315,995    Williams _____ Apr. 6, 1943